United States Patent [19]

Ury

[11] Patent Number: 4,597,185
[45] Date of Patent: Jul. 1, 1986

[54] POSITIONING UNIT FOR CORE DRILL STAND

[76] Inventor: Jack R. Ury, 540 W. Highland Ave., Tracy, Calif. 95376

[21] Appl. No.: 708,802

[22] Filed: Mar. 6, 1985

[51] Int. Cl.[4] ............................................. B23B 49/00
[52] U.S. Cl. .................................... 33/185 R; 33/189
[58] Field of Search .................... 33/185 R, 189, 191, 33/520, 552, 562, 572, 175, 1 M, 180 AT, 180 R; 408/75, 86, 115 R, 115 B, 241 G; 248/DIG. 4

[56] References Cited

U.S. PATENT DOCUMENTS

| | | | |
|---|---|---|---|
| 793,901 | 7/1905 | Noyes | 408/75 |
| 1,302,131 | 4/1919 | Carter | 33/189 |
| 2,030,280 | 2/1936 | Vigliano | |
| 2,341,107 | 2/1944 | MacDonald | 33/189 |
| 2,373,927 | 4/1945 | Turner | 33/189 |
| 3,015,889 | 1/1962 | Godman | 33/189 |
| 3,195,240 | 7/1965 | Parker | 33/180 AT |
| 3,228,112 | 1/1966 | Hanks | 33/189 |
| 3,382,582 | 5/1968 | Matson | 33/572 |
| 3,760,507 | 9/1973 | La Rocca | 33/203.21 |
| 4,365,418 | 12/1982 | Hoyss et al. | 33/185 R |
| 4,389,790 | 6/1983 | Dunlap | 33/185 R |

Primary Examiner—Charles Frankfort
Assistant Examiner—Patrick R. Scanlon
Attorney, Agent, or Firm—Dennison, Meserole, Pollack & Scheiner

[57] ABSTRACT

A positioning unit for drill stands, the positioning unit including a flat base, a vertical support panel rigid with and extending perpendicular from one end of the base, an elongate slot through the support panel, an elongated sleeve transversely aligned with the slot and longitudinally adjustable therealong, and an elongate pointer rod slidably received through the sleeve and selectively locked therein in a slidably adjusted position. Side braces extend between the base and the support panel and project below the base to define side flanges for cooperation with the base in a mounting of the positioning unit on the support bar of a drill stand.

5 Claims, 7 Drawing Figures

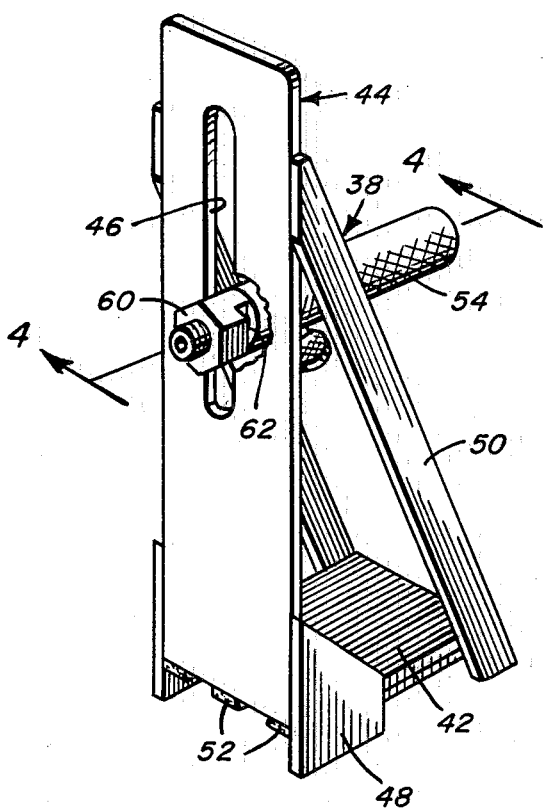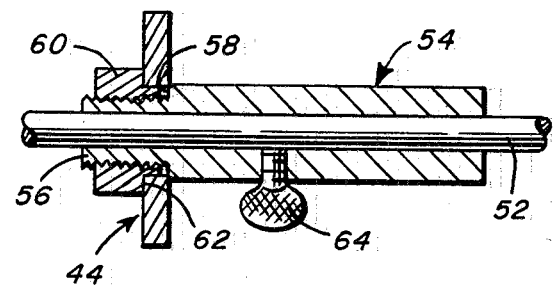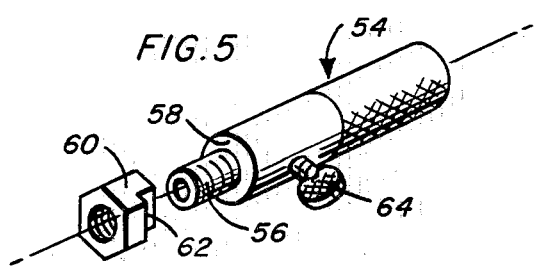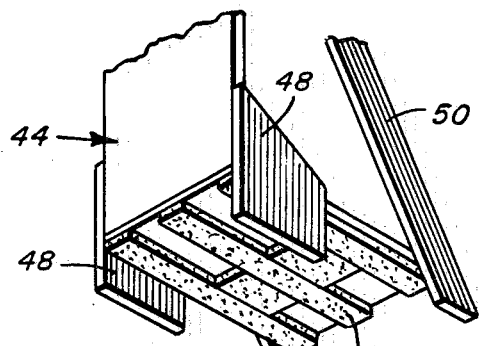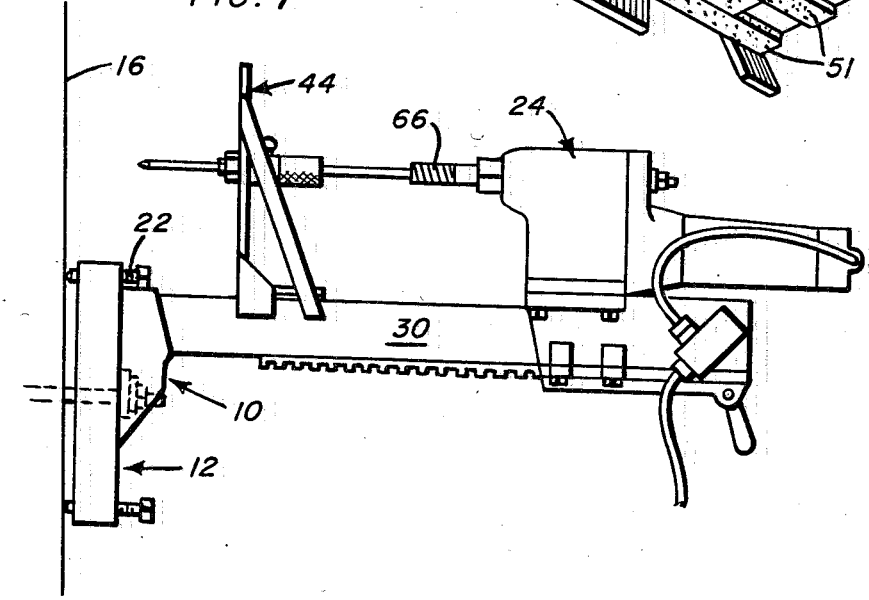

POSITIONING UNIT FOR CORE DRILL STAND

BACKGROUND OF THE INVENTION

In the various construction industries, it is frequently necessary to provide enlarged holes or openings through previously formed walls, wall sections, and the like. These openings, particularly wherein a poured concrete construction is involved, are normally formed by core drills mounted on an appropriate drill stand. Such stand-mounted drills frequently utilize enlarged cylindrical bits to remove a core or plug of material and define an enlarged opening capable of accommodating plumbing, electrical pipes, or the like.

Conventionally, the drill stand will include a mounting bracket with a support bar projecting perpendicularly from the bracket. The support bar accommodates the drill assembly, including the drill motor and drill bit, along with a carriage mounting the drill assembly for longitudinal movement along the support bar.

The drill stand is mounted to a surface in a position generally contemplated to locate the drill bit in alignment with the area to be drilled, designated either by a center point mark on the surface or a center point mark in conjunction with outer markings corresponding to the circumference of the bit. The actual mounting of the stand to the surface is generally affected by a single anchor bolt extending through an elongated slot in the bracket which allows for a physical shifting of the bracket in order to obtain a specific alignment of the bit.

When designating the area to be drilled by only a center point, it will be appreciated that substantial difficulty can be encountered in properly aligning the bit, particularly in those instances when an enlarged tubular core bit is required. The alignment problem can be alleviated, to a degree, by providing peripheral marks corresponding to the periphery of the bit and equi-distant outward from the center point completely thereabout. However, the provision of multiple marks in addition to the center point can lead to errors and can be particularly bothersome when multiple different diameter bits are alternatively used. More importantly, inasmuch as the drill apparatus or assembly can weight anywhere from 40 lbs. to 150 lbs., depending on the size of the bit, an adjustment of the drill stand with the drilling apparatus mounted on the support bar can be a difficult and cumbrous task especially in those instances wherein a hole is to be provided at a point whereat access is difficult or awkward, for example near the ceiling, corners or floor.

An example of a drill stand as discussed above will be noted in U.S. Pat. No. 4,365,418 issued to Hoyss et al on Dec. 28, 1982. This drill stand attempts to overcome centering problems by the provision of a marking element formed as a part of the drill stand base and selectively extended and retracted relative thereto with the drilling apparatus positioned upwardly therefrom on a support column.

SUMMARY OF THE INVENTION

The present invention is directed to an improved system for positioning drill stands to align the drilling apparatus, and more particularly the drill bit, with the center point of a portion of a wall or the like to be removed by the bit. The system contemplates provision for an adjustment and proper positioning of the drill stand without requiring that the heavy and cumbersome drilling apparatus be mounted thereon during adjustment. Rather, the drilling apparatus is only mounted for the stand has been properly positioned. Further, inasmuch as the present invention contemplates a positive orientation of the drill stand relative to the center point, there is no necessity for providing outer or peripheral locating marks.

In achieving the particular advantages contemplated, the invention purposes utilization of a positioning unit or guide incorporating a base for removable engagement with the support bar of the drill stand and a pointer adjustable, relative to the base, for positioning at a height, relative to the support bar, corresponding to the height of the center of a bit to be used. As a matter of convenience, the pointer will normally be positioned to correspond in height to the center of the motor shaft or arbor of the motor on which the bit is to be mounted. This height will be standard regardless of the diameter of the bit. Should it be necessary to vary from the standard height, for example by the use of different drilling apparatus or an elevation in the height of the drilling apparatus to accommodate a large bit, the desired height can still be readily ascertained either by direct measurement of the height of the motor drive shaft or by an actual mounting of the drilling assembly on the support bar along with the mounted positioning unit and a direct alignment of the pointer with the bit-mounting shaft. After such an alignment, the heavy and cumbersome drilling apparatus is removed from the support bar and the drill stand adjusted for alignment of the pointer with the centerline of the area to be drilled.

The positioning unit or guide basically comprises a flat base or foot which slidably sits on the upper surface of the support bar and is precluded from lateral shifting thereof by a pair of depending side panels or flanges. A support member or panel, integral with the forward edge of the base, projects verticall therefrom at a 90° angle and can, if desired, be stabilized relative to the base by diagonal side struts or gussets. The vertical support member includes a vertically elongated slot therein which receives and elongate sleeve transversely thereof for a vertical sliding adjustment within the slot and a selecting locking thereof to the vertical support member in an adjusted position. The pointer, comprising an elongate rod with a centering point at one or both ends thereof, is slidably received through the sleeve and selectively locked therein by an appropriate thumbscrew.

The described positioning unit, with the pointer thereon at an adjusted height corresponding to the height of the drill shaft, is removably placed on the support bar and retained thereon adjacent the surface involved. The entire drill stand is then adjusted to align the pointer with the desired center point, after which the drill stand is fixed in position, the positioning unit removed, and the drilling apparatus mounted for use in the conventional manner.

BRIEF DESCRIPTION OF THE DRAWINGS

FIG. 3 is a perspective view of the positioning device of the present invention with a portion broken away for purposes of illustration;

FIG. 4 is an enlarged cross-sectional view taken substantially along a plane passing through line 4—4 in FIG. 3;

FIG. 5 is an exploded perspective view of the pointer receiving sleeve;

FIG. 6 is a partial perspective view illustrating the base portion of the positioning device; and FIG. 7 is a side elevational view illustrating, on a mounted drill stand, the operative relationship between the positioning device and the drilling unit or assembly.

DESCRIPTION OF PREFERRED EMBODIMENT

Figure 1:
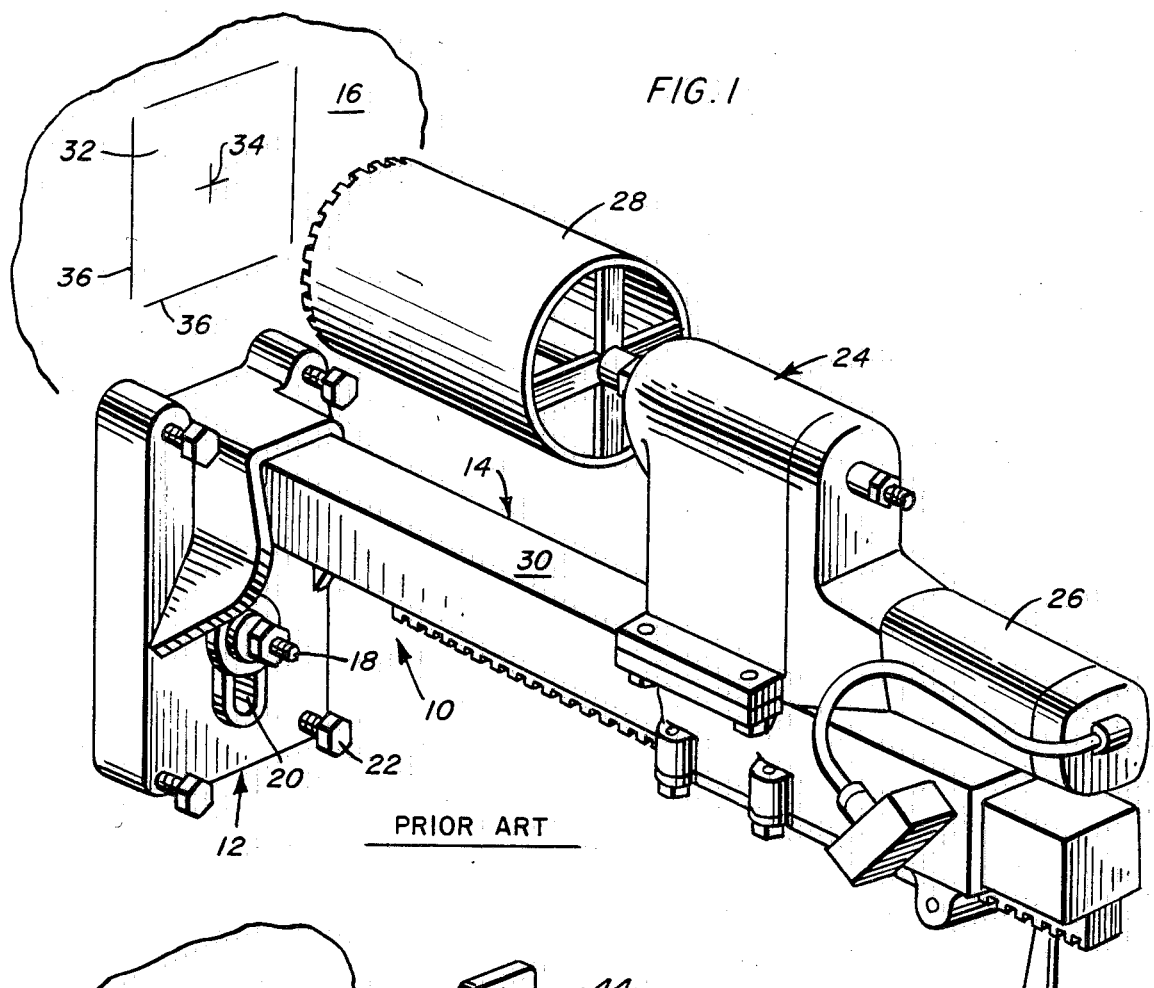
FIG. 1 is a perspective view of a drill stand mounted to a surface with a drilling unit or assembly mounted thereon for alignment with a predetermined area marked to correspond with the periphery of the bit for proper alignment of the bit through a manipulation of both the stand with the drill unit mounted thereon.

FIG. 1 illustrates a conventional drill stand 10 incorporating a mounting bracket 12 with a support bar 14 projecting perpendicularly thereto. In use, when a core is to be removed, or an enlarged aperture provided through a wall 16 or the like, the bracket 12 is mounted to the wall by an appropriate anchor bolt 18 embedded in the wall and received through a vertical elongate slot 20 in the bracket 12, allowing for both a vertical and rotational adjustment of the drill stand 10. The bracket will also normally include leveling or bracket orienting upper and lower threaded bolts 22 which, as will be noted in FIG. 7, can be selectively extended from the back face of the bracket 12 for engagement with the wall surface.

The projecting support bar 14 mounts a drill assembly 24 which includes an appropriate motor or power source 26 and a coring bit 28 aligned in laterally spaced parallel relation to the upper surface 30 of the support bar.

The mounting bolt 18 and adjustment slot 20 are provided to enable an adjustment of the drill stand 10 to properly orient the coring bit 28 with regard to a preselected portion 32 of the wall 16 through which an aperture is to be defined. Heretofore, a proper alignment of the bit 28 required an awkward and difficult manipulation of the drill stand 10 with the drill assembly 24 mounted thereon. As the drill assemblies can weigh any where from 40 lbs. to 150 lbs., substantial difficulties were encountered in the actual physical adjustment of the entire structure. Further, inasmuch as the bits are, in many instances, relatively large, it is very difficult to properly center the bit 28, other than possibly by a multiple step trial-and-error procedure. Accordingly, the apparatus, as illustrated in FIG. 1, normally requires, in addition to the center point 34, marked on the wall 16, a plurality of positioning lines 36 about the periphery of the area 32 to define outer limits, equally distant from the center point 34, for alignment of the cutting edge of the bit 28 therewith.

The present invention is directed to a positioning device 38 which enables a proper adjustment of the drill stand 10 without the presence of the extremely heavy drilling unit 24. In addition, the positioning device 38 enables a proper adjustment of the drill stand 10 utilizing only a single premarked center point 40. There is no necessity for additional outer markers.

Figure 2:
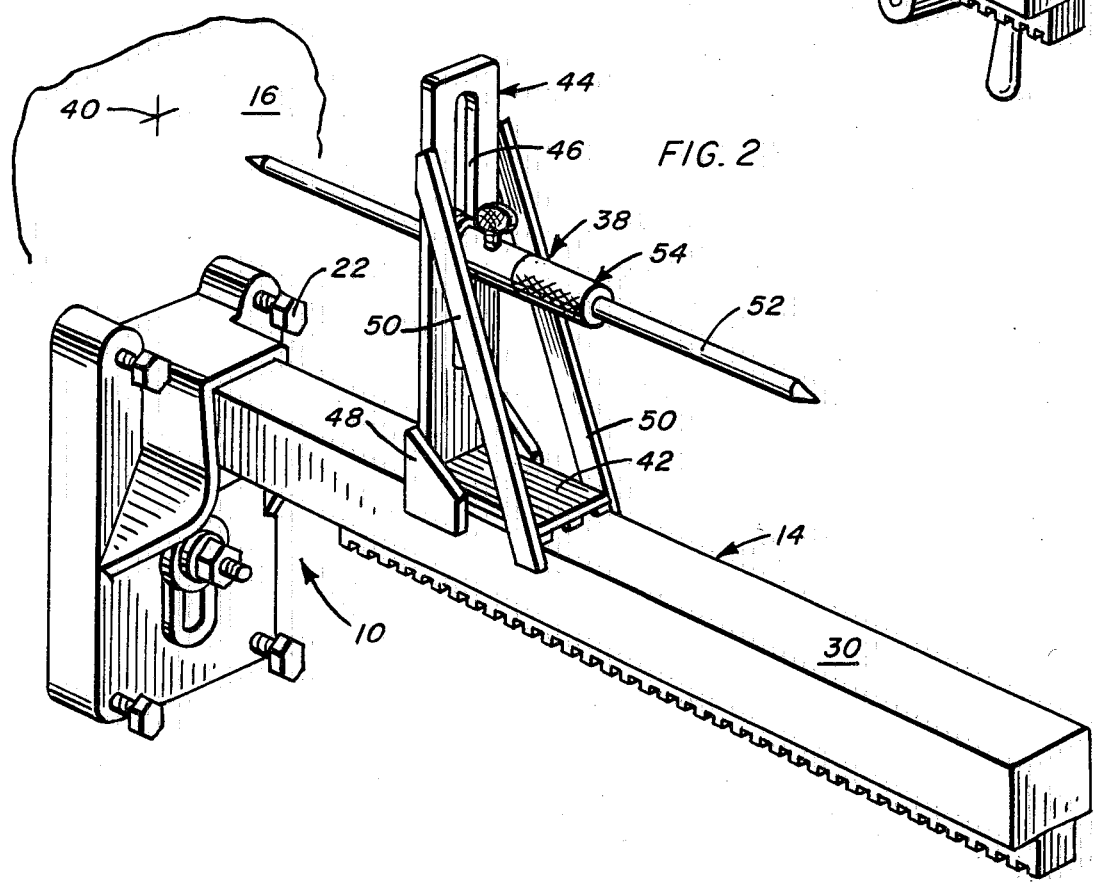
FIG. 2 is a perspective view illustrating a drill stand with the drilling unit removed and the positioning device of the present invention mounted thereon for alignment with a single center point mark through an adjustment of the drill stand and without the cumbersome weight of the drilling unit.

The manner of use of the positioning device 38 will be best appreciated from FIG. 2 wherein the positioning device 38 is illustrated in operable position on the support bar 14 of a wall mounted drill stand 10. The positioning device 38 includes a base plate 42 with a vertically elongated support member 44 rigidly affixed to one edge of the base plate 42. The vertical support member 44 includes an elongated vertical hole or slot 46 centrally therealong.

The base member 42 and vertical support member 44 are further interconnected and rigidified by a pair of side panels 48, to the opposite sides of the positioning device 38 and rigidly affixed across the angle defined between the base 42 and the support member 44, forming in effect structure rigidifying gussets. Further rigidification is introduced by a pair of opposed rigid braces 50 respectively secured to the base panel 42 toward the outer end thereof remote from the vertical support member 44 and at the other end to the opposed sides of the vertical support member 44 toward the upper end thereof.

The lower end portions of both the rigidifying panels 48 and the rigidifying braces 50 extend below the base or base panel 42 and thereby function as positioning or stabilizing flanges or side members which, upon a mounting of the positioning device 38, engage the opposed sides of the drill stand support bar 14 to properly position the positioning device thereon and provide lateral stability. As will be appreciated, the width of the base 42 corresponds to that of the support bar 14 with the base seating directly on the upper surface 30 of the bar 14 for selective movement therealong. Additional stability can be introduced into the mounted positioning device 38 by utilizing magnetic strips 52 adhesively bonded, or otherwise affixed to the undersurface of the base panel 42 for magnetically fixing the positioning device 38 to the upper surface 30 of the bar 14 in a manner which enables a manual adjustment of the positioning device and a releasable stabilization of the positioning device in its adjusted position. It is contemplated that the various components of the positioning device 38, including the base 42, upright support 44, gussets 48 and braces 50 be of metal with the components being rigidly interconnected by welding or the like.

Actual alignment with the center point 40 of the contemplated hole is by means of an elongated rod or pointer 52 slidably received through an elongate sleeve 54 which is, in turn, adjustably mounted within the slot 46. Noting FIGS. 3, 4 and 5 in particular, the sleeve 54 has a reduced threaded end 56 through the slot 46. An annular shoulder 58 is defined on the sleeve 54 by the reduced threaded end portion 56. This shoulder 58 engages against the face of the vertical support member 44, allowing only projection of the threaded end portion 56 therethrough. A mounting nut 60 is positioned to the opposite side of the support member 44 and threadedly receives the end portion 56 therein. This nut 60 has opposed cutaway portions defining a reduced section including opposed flats 62. This reduced portion is non-rotatably received within the slot 46 with the nut 60 being of greater width than the slot 46 and engageable against the surface thereof opposed from the surface engaged by the sleeve shoulder 58. Adjustment of the sleeve 54 along the length of the slot 46, and hence a corresponding adjustment of the pointer rod 52, is effected by a selective rotation of the sleeve 54 relative to the nut 60. In other words, while the nut is non-rotatably secured, the sleeve is free to rotate with a clockwise rotation of the sleeve 54 bringing the sleeve and nut into clamping engagement with the opposed faces of the support member 44. Similarly, a counter-rotation of the sleeve 54 will threadedly withdraw the reduced threaded end portion 56 from the nut and out of clamping engagement with the support member for a vertical shifting of the sleeve as desired. As will be noted, the sleeve maintains the pointer rod 52 so as to parallel the support bar 14. A longitudinal adjustment of the pointer rod 52 is contemplated, with the rod being selectively fixed in position through an appropriate set screw 64 threaded through the side of the sleeve 54 and selectively engaging the rod 52 therein.

In use, the pointer rod 52 is positioned at a predetermined height relative to the base 42 to conform to the chuck portion 66 of the drill apparatus 24, this of course corresponding to the center point of any mounted bit 28. This height will normally be easily ascertained by measuring the vertical distance between the chuck of the drilling apparatus to be used and the base of the drilling apparatus which is to sit on the upper surface 30 of the support rod 14. After a setting of the proper height of the pointer rod, the positioning device 38 is seated on the support rod 30 with the leading tapered end of the rod 52 brought in closely spaced relation to the surface of the wall 16. Next, the entire drill stand 10 is adjusted, through the mounting bolt 18 and the bracket slot 20, to directly align the point of the rod 52 with the center point 40 marked on the wall. The drill stand bracket 12 is then fixedly clamped into position. At this time, whatever adjustments need be made in the leveling screws 22 can be effected. The entire adjustment and aligning procedure is done without the necessity for maintaining the drilling apparatus 24 itself on the drill stand or support bar, and without a direct alignment of the bit with the portion of the wall to be removed. It will also be appreciated that the alignment is achieved using only a single center point on the wall. The ability to properly position the drill stand prior to the mounting of the drilling apparatus thereon and by utilizing only a single center point mark, is a significant advance in the art, greatly facilitating a proper orientation of the drilling apparatus regardless of the location at which the holes are to be cut.

Once the drill stand 10 has been properly positioned, utilizing the positioning device 38 as previously described, the drilling apparatus 24, noting FIG. 7 in particular, can be mounted on the support bar 14. At this time, as a means for checking the proper orientation of the drill stand 10, the positioning device 38 can be slid outward or backward on the support bar 14 toward engagement of the rear of the pointer rod 52 within the bit-mounting chuck. With proper use of the positioning device, there should be no misalignment. However, if there is any misalignment, it will be readily apparent. Further, at that time the pointer rod 52 can be vertically adjusted, the drilling apparatus removed, and the drill stand readjusted.

On occasion, for example those instances wherein an extremely large bit is used, it is necessary to elevate or increase the height of the drilling apparatus relative to the support bar. In these instances, adapter plates will be used. This variation in height can easily be accommodated by a corresponding elevation of the sleeve mounted pointer rod within the vertically elongate slot 46 of the positioning device. In each instance, the proper height of the pointer rod 52 can easily be determined.

As will be noted from the drawings, the pointer rod 52 is quite long. This is desirable in those instances wherein angle holes are to be drilled which requires that the drill stand be positioned an increased distance away from the wall.

From the foregoing, it will be appreciated that the positioning device of the present invention is capable of providing distinct and significant advantages in both facilitating the physical manipulation of the drill stand and greatly simplifying the specific alignment thereof without requiring the actual presence of the drilling apparatus.

I claim:

1. For use in combination with a drill stand adapted to mount and guide a core drill apparatus, said drill stand having an adjustable surface-mounted bracket with an elongate drill apparatus support bar rigid with said bracket and projecting generally perpendicular therefrom for adjustment with the bracket; a positioning unit for positioning the drill stand, independent of the core drill apparatus, relative to a predetermined point on the surface receiving the drill stand, said positioning unit being mountable on the support bar independently of the core drill apparatus, said positioning unit comprising a base configured to conform to the support bar for transverse introduction thereon and longitudinal movement therealong, and for movement therewith upon adjustment of the adjustable bracket, said base comprising a planar base panel adapted to overlie and be supported on the support bar, and a pair of laterally spaced side members rigid with said planar base panel and projecting therefrom for reception of the support bar therebetween, a rigid support panel having a first end rigid with said base panel, said support panel projecting perpendicularly from said base panel to extend perpendicular from the support bar, a longitudinally elongate slot defined through said support panel, a sleeve extending perpendicularly to one side of said support panel in alignment with said slot and parallel to said base panel, means mounting said sleeve for fixed positioning at selected positions along said elongate slot determinative by the core drill apparatus to mount on the stand, an elongate alignment rod slidably received within said sleeve and extending through said slot perpendicular to said support panel, and means for fixing said rod within said sleeve in a slidably adjusted position therein for selective alignment with a predetermined point on the surface receiving the drill stand upon adjustment of the surface-mounted bracket, whereby upon adjustment of said bracket to align said rod with the predetermined point, the drill stand is positioned to center the core drill apparatus relative to the predetermined point upon mounting the core drill apparatus on the drill stand support bar.

2. The positioning unit of claim 1 wherein said laterally spaced side members extend between and are fixedly secured to said base panel and said support panel to define stabilizing braces therebetween.

3. The positioning unit of claim 1 including magnetic means fixed to said planar base panel in underlying relation thereto for selective retention of said positioning unit on the support bar of a drill stand.

4. The positioning unit of claim 1 wherein the means mounting said sleeve comprises a reduced threaded end portion on said sleeve received through said elongate slot, and nut means threaded on said reduced end portion of said sleeve and positioned on the opposite side of said support panel from said sleeve, said sleeve and said nut means clamping said support panel, adjacent said elongate slot, therebetween.

5. The positioning unit of claim 4 wherein said nut means includes a reduced portion received within said elongate slot about the reduced end portion of said sleeve, the reduced portion of said nut means being retained in said elongate slot against rotation whereby clamping of said support panel is effected by rotation of said sleeve relative to said nut means.

* * * * *